United States Patent
Fatemi et al.

(10) Patent No.: US 11,169,846 B2
(45) Date of Patent: Nov. 9, 2021

(54) SYSTEM AND METHOD FOR MANAGING TASKS AND TASK WORKLOAD ITEMS BETWEEN ADDRESS SPACES AND LOGICAL PARTITIONS

(71) Applicant: TIBCO Software Inc., Palo Alto, CA (US)

(72) Inventors: Reza Fatemi, Mission Viejo, CA (US); John Driver, Sunnyvale, CA (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 138 days.

(21) Appl. No.: 16/116,771

(22) Filed: Aug. 29, 2018

(65) Prior Publication Data
US 2020/0073707 A1  Mar. 5, 2020

(51) Int. Cl.
G06F 9/48 (2006.01)
G06F 9/50 (2006.01)

(52) U.S. Cl.
CPC ............ G06F 9/4881 (2013.01); G06F 9/485 (2013.01); G06F 9/505 (2013.01); G06F 9/5038 (2013.01)

(58) Field of Classification Search
CPC .................................................. G06F 9/4881
See application file for complete search history.

(56) References Cited

U.S. PATENT DOCUMENTS

| | | | | |
|---|---|---|---|---|
| 6,351,749 | B1* | 2/2002 | Brown | G06F 16/284 |
| 2007/0074208 | A1* | 3/2007 | Ling | G06F 9/45558 718/1 |
| 2007/0113231 | A1* | 5/2007 | Honmura | G06F 9/5066 718/100 |
| 2008/0320216 | A1* | 12/2008 | Fertig | G06F 12/1036 711/108 |
| 2016/0132692 | A1* | 5/2016 | Kerschbaum | G06F 21/6227 713/189 |
| 2018/0165170 | A1* | 6/2018 | Hegdal | G06F 11/1446 |

* cited by examiner

*Primary Examiner* — Sisley N Kim
(74) *Attorney, Agent, or Firm* — McGuireWoods LLP

(57) ABSTRACT

A system for scheduling and dispatching workload items between tasks can include an aggregated file structure and a task scheduler. The aggregated file structure comprises at least one logical partition with each partition having a secondary operating system and address spaces and a plurality of tasks executable therein. The task scheduler is executable from the primary operating system and can receive a service request from a task requesting an action from at least one other task and writing the action, a first task identifier, and at least one other task identifier to at least one private memory address associated with the other task or tasks. The service request action can be a start service request, a stop service request, a suspend service request, a resume service request, change the order of execution service request, or a change priority of executing tasks service request.

20 Claims, 3 Drawing Sheets

SYSTEM AND METHOD FOR MANAGING TASKS AND TASK WORKLOAD ITEMS BETWEEN ADDRESS SPACES AND LOGICAL PARTITIONS

TECHNICAL FIELD OF THE DISCLOSURE

The present disclosure relates, in general, to task schedulers used in operating systems to queue tasks for processing and, in particular, to a task scheduler to manage communications between tasks and distributing task work load items between address spaces of logical partitions.

BACKGROUND

IBM® z/OS® is a popular 64-bit operating system used in mainframe computing environments. z/OS® can also be used with Parallel Sysplex to manage clusters of mainframe OS's for the purpose of distributing application workload for high performance and high availability. However, there are limitations of the z/OS® system when used with Parallel Sysplex that limits the performance of the mainframe clusters. Specifically, improvements in how tasks are communicated and processed between OS address spaces within a clustered environment is needed.

SUMMARY

The present disclosure relates to a system for scheduling and dispatching workload items between tasks. More specifically, the system provides a means by which tasks can communicate directly with other tasks without using traditional OS kernel scheduling features that use connection and session based communications and can communicate between address spaces within a logical partition and between address spaces of different logical partitions. Additionally, the system provides a means by which a task can control the programmatic operation of another task, e.g. to start, stop, suspend, resume, change the priority level, and the order of execution.

In one aspect, the present disclosure is directed to a system for scheduling and dispatching workload items between tasks. The system includes: an aggregated file structure comprising at least one logical partition with each logical partition having a secondary operating system and address spaces and a plurality of tasks executable therein; and a task scheduler executable from the primary operating system for receiving a service request from a task requesting an action from at least one other task and writing the action, a first task identifier, and at least one other task identifier to at least one private memory address associated with the at least one other task.

In another aspect, the present disclosure is directed to a computer aided method for scheduling and dispatching workload items between tasks. The method comprising: executing the plurality of secondary operating systems on an aggregated file structure comprising at least one logical partition with each logical partition having a secondary operating system and address spaces and a plurality of tasks executable therein; receiving, at a task scheduler executing from the primary operating system, a service request from a task requesting an action from at least one other task; and writing the action, a first task identifier, and at least one other task identifier to at least one private memory address associated with the at least one other task.

In yet another aspect, the present disclosure is directed to a non-transitory computer readable storage medium comprising a set of computer instructions executable by a processor for scheduling and dispatching workload items between tasks. The computer instructions are configured to execute the plurality of secondary operating systems on an aggregated file structure comprising at least one logical partition with each logical partition having a secondary operating system and address spaces and a plurality of tasks executable therein; receive, at a task scheduler executing from the primary operating system, a service request from a task requesting an action from at least one other task; and write the action, a first task identifier, and at least one other task identifier to at least one private memory address associated with the at least one other task.

In some embodiments, the service request action can be one of a start service request, a stop service request, a suspend service request, a resume service request, change the order of execution service request, and change priority of executing tasks service request. In these embodiments, the task scheduler can cause the instantiation of the second task in response to the action. In these embodiments, the address space of the task can be the same as the address space of the other task and the other task can be a sub-task of the task. In these embodiments, the address space of the task can be different from the address space of the other task and both address spaces can belong to the same logical partition or different logical partitions. In these embodiments, the task scheduler can write input data received from the task to the private address space of the other task. In these embodiments, each of the other tasks can be the same task.

Additional embodiments, advantages, and novel features are set forth in the detailed description.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

The traditional z/OS® scheduler and dispatch control mechanism has limitations that effect the overall performance of the system when used in clustered mainframe environments. The traditional z/OS® scheduler and dispatch control mechanism used to schedule and dispatch workloads between Address Spaces (AS's) requires that both the sending and receiving AS are active at the time a connection between them is established. If either AS is stopped, the connection is broken and must be re-established. Furthermore, the traditional z/OS® mechanism for dispatching Service Request Blocks (SRBs) between AS requires a connection and session to be instantiated between the sending and receiving AS. The traditional z/OS® allows a task to initiate the creation of a connection and session between its own AS and another existing AS, or cause the instantiation of a new AS and the creation of the relevant connection and session. However, although connections may span Logical Partitions (LPAR), inter-AS dispatch is only available within an LPAR. In addition, a newly instantiated AS or a newly instantiated task must be within the same LPAR as the instantiator. The present disclosure provides a novel and an innovative scheduler and dispatch control mechanism for use with z/OS®, or similar type systems, when used in clustered mainframe computing environments that address these limitations.

Figure 1:
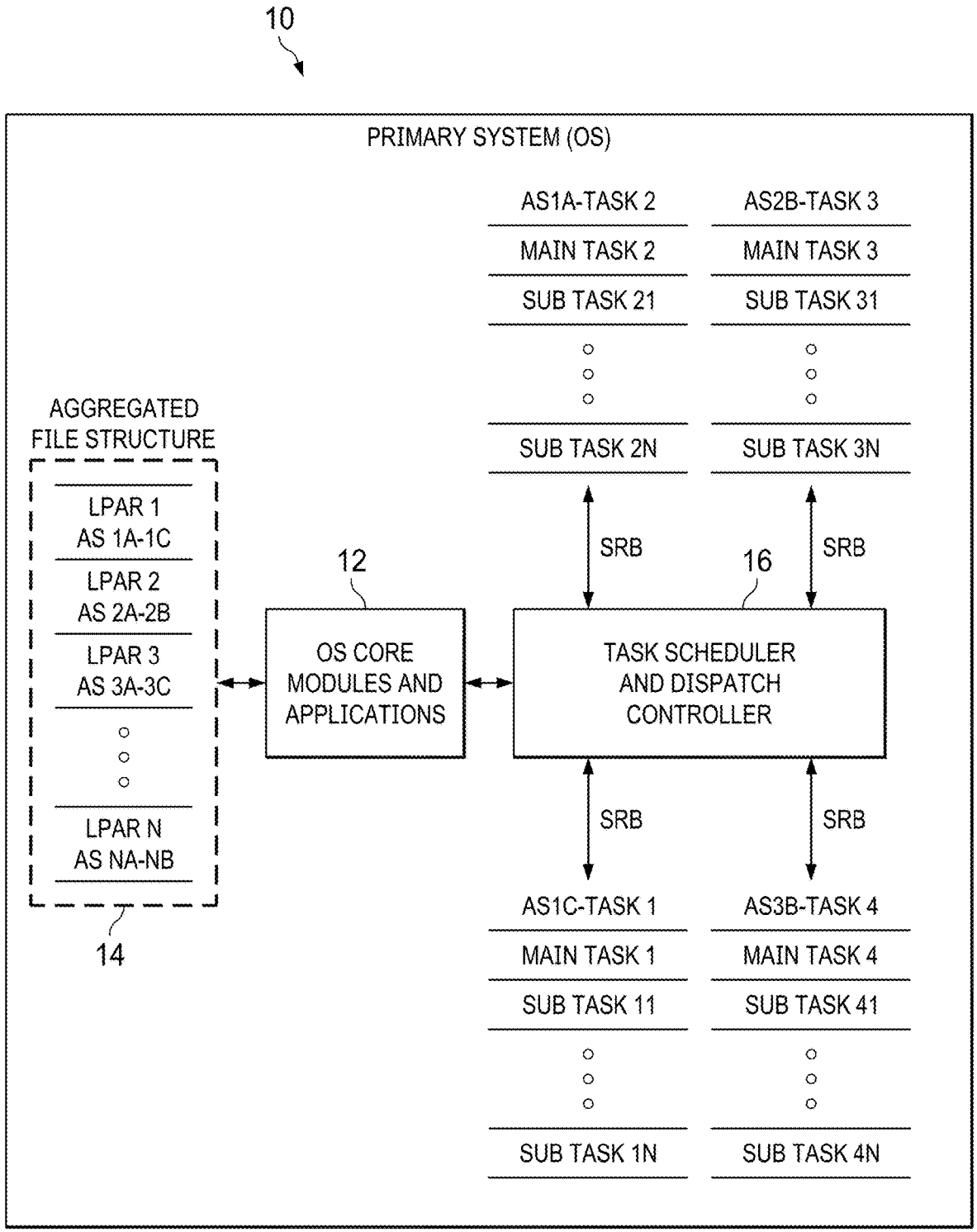
FIG. 1 is an illustration of a system for managing tasks on an aggregated file structure comprising multiple logical partitions and operating systems (OS's) from a primary operating system, in accordance with certain example embodiments.

Referring now to FIG. 1, illustrated is a system 10 for managing tasks on an aggregated file structure comprising multiple logical partitions and operating systems (OS's) from a primary operating system, in accordance with example embodiments. The system 10 includes OS core modules and applications 12, i.e. the primary OS, an aggregated file structure 14, and a task scheduler and dispatch controller 16. The OS core modules and applications 12 can be part of a z/OS from IBM® and can include a Parallel Sysplex application system, used to aggregate and create the file structure 14. The algorithmic functions of the scheduler and dispatch controller 16 can be an added application component to the OS modules and applications 12. The aggregated file structure 14 can include multiple Logical Partitions (LPAR) with each LPAR executing its own OS, i.e. secondary OS. Tasks within each LPAR are assigned an Address Space (AS) and are executable therein. The task scheduler 16 can access the list of AS's in a partition and, therefore, tasks can schedule and dispatch actionable requests, i.e. work load items, between tasks within an AS and between tasks in different AS's. Task in this context means either task or sub-task; however, task and associated sub-tasks share an AS. The actionable requests have special meaning and are defined as follows.

Start: Provides the ability for any task to start a newly created task in an existing address space and additionally supply the Task with input allowing for autonomous execution.

Stop: Provides any task the means to locate, identify and stop an existing executing Task.

Uses: Kill Runaway Tasks, stop incorrectly executing tasks.

Suspend: Provides any task with the means to locate, identify and suspend execution of an existing executing task.

Resume: Provides any task with the means to locate, identify and resume execution of an existing Task that is in a suspended state and has been suspended by this invention.

Change the order of execution: Provides any task with the means to set the order of execution during a Start of a task, or locate, identify and change the order of execution of tasks that are in a suspended state. Once a task is started it must be suspended to change the order of execution.

Change priority: Provides any task with the means to locate, identify and change the priority of an existing executing Task that has been started by this invention.

In practice, the scheduler 16 can identify all tasks and write to a private memory address of each task, directly, e.g. using the /dev or /proc filesystem, InterProcess Communications (IPC), and sockets without requiring the establishment of a connection or session using information provided by OS core modules and applications 12 and information provided by OS's executing on the LPAR's within aggregated file structure 14. Dispatch is made by scheduler and dispatch controller by providing the sending AS with the means to write into the private memory of the receiving AS. The SRB that is being sent between Address Spaces is augmented with metadata that provides the receiving Address Space information about the desired Task assignment and execution priority. An advantage of the system is that if the scheduler address space is overloaded with tasks, then by scheduling excess tasks in a secondary address space to perform parallel work context switching can be reduced and distributed since the secondary address space uses its own processors. This greatly improves the operating efficiencies system or processor operating efficiencies.

As an example application, the scheduler 16 can allow AS 1A-Task 2, or any sub-task therein, to send an SRB (Service Request Block) that includes a Start, Stop, Suspend, Resume, Change, or Change the order of execution, or any combination therein to any other task, either within the same AS or in another AS, such as between sub-task 21, 22, 23 of AS 1A-Task 2 and sub-task 11 and 12 of AS 1C-TASK 1 or between sub-task 21, 22, 23 of AS 1A-Task 2 and sub-task 31, 32 of AS 2B-Task 3. The z/OS, e.g., can assign one or more CPUs to each AS, but only one CPU per AS can be active at any one time. In contrast, CPUs in different AS can be active in parallel. To enable parallel execution, tasks can be created within, or dispatched to multiple AS's. The scheduler 16 can combine fine☐grained inter☐AS dispatch and task control that allows a task to programmatically dispatch work to another AS, where the priority and order of its execution can be controlled. The scheduler 16 can instantiate a new AS and, as such, tasks can be executed in parallel to provide a highly scalable and agile system 10. For example, AS 1A-Task 2 may be an Apache web server that when under a certain load sends an SRB message that includes a Start actionable request that includes the task identifier and number of requested instances and any configuration or input data needed. The scheduler 16 can create the requested number of instances AS 2A-2B of LPAR 2 and AS 3A-3C of LPAR 3. Alternatively, consider a task with a queue of similar workload items, i.e. sub-tasks, which can be logically executed in parallel. The scheduler 16 can measure the time to execute the first item on the queue and this measurement can be used to determine whether additional items on the queue should be executed locally, or dynamically dispatched to one or more other AS's for parallel execution. The dispatching task can account for the time required by the dispatch itself, the creation of a new sub-task in the receiving task (if so directed by the dispatch), and the actual workload execution.

Figure 2:
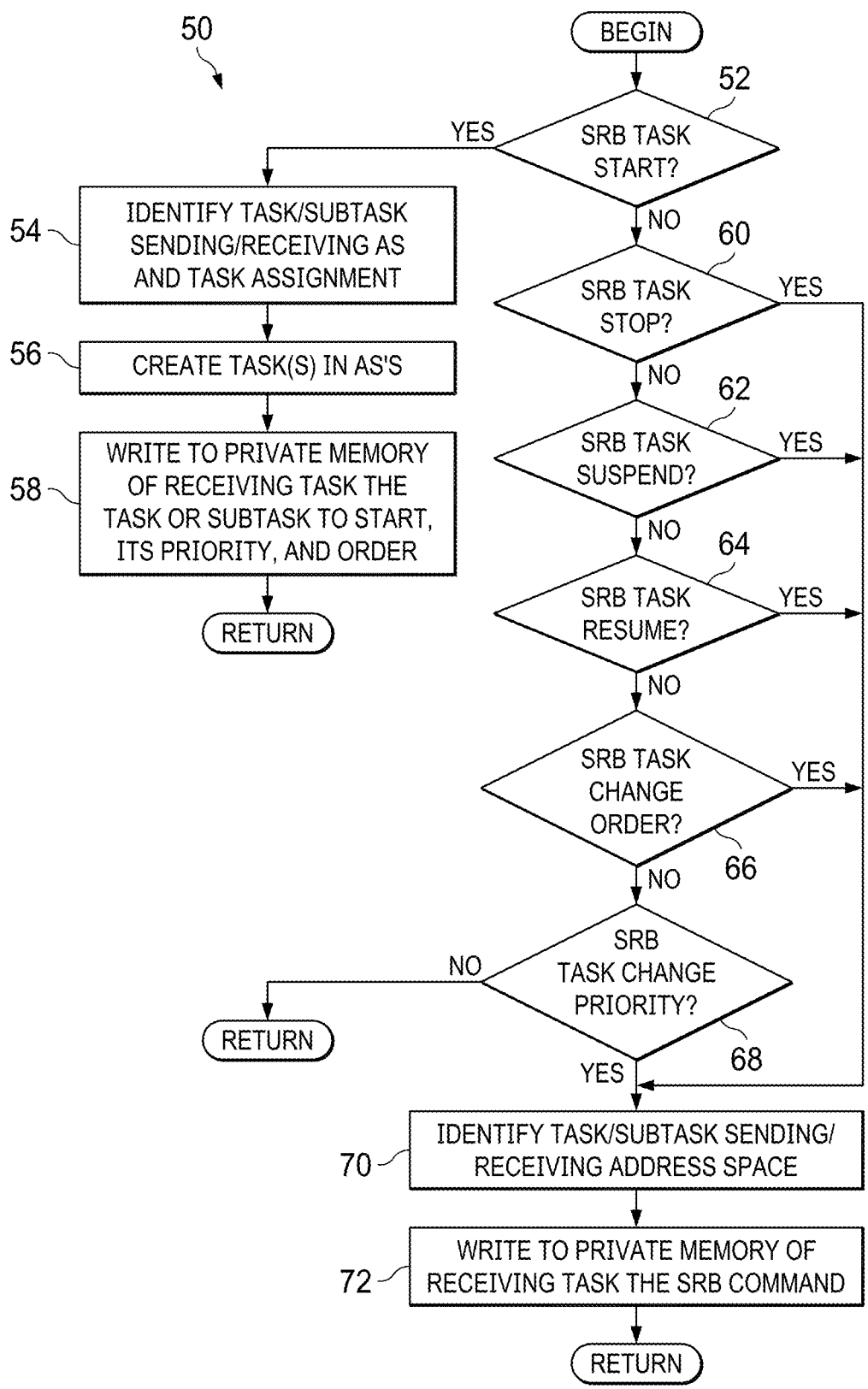
FIG. 2 is an illustration of a scheduler and dispatch controller algorithm for managing tasks on an aggregated file structure comprising multiple logical partitions and operating systems (OS's) from a primary operating system, in accordance with certain example embodiments.

Referring now to FIG. 2, illustrated is a scheduler and dispatch controller algorithm 50 for managing tasks on an aggregated file structure comprising multiple logical partitions and operating systems (OS's) from a primary operating system, in accordance with example embodiments. The algorithm 50 begins upon the execution of a plurality of secondary operating systems on the aggregated file structure 14. The aggregated file structure 14 includes at least one logical partition with each logical partition having a secondary operating system and address spaces and a plurality of tasks executable therein. The algorithm 50 continues by first determining the type of SRB and actionable request received. If the algorithm 50 determines that a task start actionable request is received, block 52, the sending and receiving task and, optionally, sub-task AS is identified, block 54. Although, in the case of a un-instantiated receiving task, the AS can be identified after the task is created through instantiation, block 56. The scheduler algorithm 50 writes SRB task start command as well as any input data provided by the sending task to a private memory address associated with the AS of the receiving task. The SRB task start command can also include a request to change the priority setting and order of execution of the receiving task. If the algorithm 50 determines that a task stop actionable request, block 60, a task suspend actionable request, block 62, a task resume actionable request, block 64, a task change order actionable request, block 66, and task change priority actionable request, block 68, is received, the sending and receiving task and, optionally, sub-task AS is identified, block 70, and the scheduler algorithm 50 writes the SRB command as well as any input data provided by the sending task to a private memory address associated with the AS of the receiving task. Multiple SRB commands can be sent at once to the receiving task.

Figure 3:
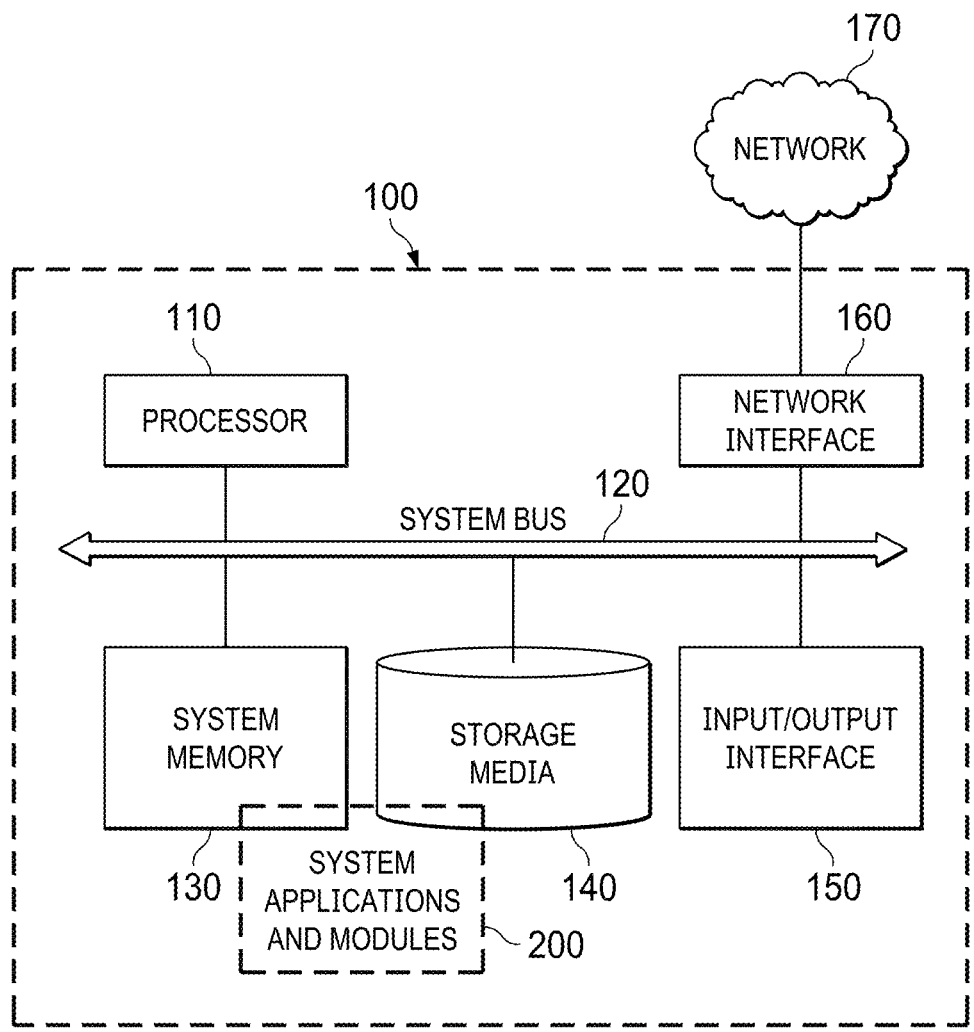
FIG. 3 is a block diagram depicting a computing machine and system applications, in accordance to certain example embodiments.

Referring now to FIG. 3, illustrated is a computing machine 100 and a system applications module 200, in accordance with example embodiments. The computing machine 100 can correspond to any of the various computers, mobile devices, laptop computers, servers, embedded systems, or computing systems presented herein. The module 200 can comprise one or more hardware or software elements, e.g. other OS application and user and kernel space applications, designed to facilitate the computing machine 100 in performing the various methods and processing functions presented herein. The computing machine 100 can include various internal or attached components such as a processor 110, system bus 120, system memory 130, storage media 140, input/output interface 150, a network interface 160 for communicating with a network 170, e.g. cellular/GPS, Bluetooth, or WI-FI.

The computing machines can be implemented as a conventional computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

The processor 110 can be designed to execute code instructions in order to perform the operations and functionality described herein, manage request flow and address mappings, and to perform calculations and generate commands. The processor 110 can be configured to monitor and control the operation of the components in the computing machines. The processor 110 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 110 can be a single processing unit, multiple processing units, a single processing core, multiple processing cores, special purpose processing cores, co-processors, or any combination thereof. According to certain embodiments, the processor 110 along with other components of the computing machine 100 can be a software based or hardware based virtualized computing machine executing within one or more other computing machines.

The system memory 130 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 130 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 130. The system memory 130 can be implemented using a single memory module or multiple memory modules. While the system memory 130 is depicted as being part of the computing machine, one skilled in the art will recognize that the system memory 130 can be separate from the computing machine 100 without departing from the scope of the subject technology. It should also be appreciated that the system memory 130 can include, or operate in conjunction with, a non-volatile storage device such as the storage media 140.

The storage media 140 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 140 can store one or more operating systems, application programs and program modules, data, or any other information. The storage media 140 can be part of, or connected to, the computing machine. The storage media 140 can also be part of one or more other computing machines that are in communication with the computing machine such as servers, database servers, cloud storage, network attached storage, and so forth.

The applications module 200 and other OS application modules can comprise one or more hardware or software elements configured to facilitate the computing machine with performing the various methods and processing functions presented herein. The applications module 200 and other OS application modules can include one or more algorithms or sequences of instructions stored as software or firmware in association with the system memory 130, the storage media 140 or both. The storage media 140 can therefore represent examples of machine or computer readable media on which instructions or code can be stored for execution by the processor 110. Machine or computer readable media can generally refer to any medium or media used to provide instructions to the processor 110. Such machine or computer readable media associated with the applications module 200 and other OS application modules can comprise a computer software product. It should be appreciated that a computer software product comprising the applications module 200 and other OS application modules can also be associated with one or more processes or methods for delivering the applications module 200 and other OS application modules to the computing machine via a network, any signal-bearing medium, or any other communication or delivery technology. The applications module 200 and other OS application modules can also comprise hardware circuits or information for configuring hardware circuits such as microcode or configuration information for an FPGA or other PLD. In one exemplary embodiment, applications module 200 and other OS application modules can include algorithms capable of performing the functional operations described by the flow charts and computer systems presented herein.

The input/output ("I/O") interface 150 can be configured to couple to one or more external devices, to receive data from the one or more external devices, and to send data to the one or more external devices. Such external devices along with the various internal devices can also be known as peripheral devices. The I/O interface 150 can include both electrical and physical connections for coupling the various peripheral devices to the computing machine or the processor 110. The I/O interface 150 can be configured to communicate data, addresses, and control signals between the peripheral devices, the computing machine, or the processor 110. The I/O interface 150 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 150 can be configured to implement only one interface or bus technology. Alternatively, the I/O interface 150 can be configured to implement multiple interfaces or bus technologies. The I/O interface 150 can be configured as part of, all of, or to operate in conjunction with, the system bus 120. The I/O interface 150 can include one or more buffers for buffering transmissions between one or more external devices, internal devices, the computing machine, or the processor 120.

The I/O interface 150 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 150 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 100 can operate in a networked environment using logical connections through the NIC 160 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 110 can be connected to the other elements of the computing machine or the various peripherals discussed herein through the system bus 120. It should be appreciated that the system bus 120 can be within the processor 110, outside the processor 110, or both. According to some embodiments, any of the processors 110, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A system for scheduling and dispatching workload items between tasks, the system comprising:
    an aggregated file structure comprising of at least one logical partition with each logical partition having an operating system with multiple address spaces and a plurality of tasks executable therein; and
    a task scheduler, executable from a primary operating system, for:
        receiving a plurality of service requests from two or more tasks of the plurality of tasks, each service request identifying an action;
        requesting, for each task, the action from at least one other task; and
        writing, for each task, the action, a first task identifier, and at least one other task identifier to at least one private memory address associated with the at least one other task.

2. The system of claim 1 wherein the service request is one of a start service request, a stop service request, a suspend service request, a resume service request, change the order of execution service request, and change priority of executing tasks service request.

3. The system of claim 1 wherein the task scheduler causes the instantiation of the at least one other task in response to the action.

4. The system of claim 1 wherein the address space of the task is the same as the address space of the at least one other task.

5. The system of claim 4 wherein the at least one other task is a sub-task of the task.

6. The system of claim 1 wherein the address space of the task is different from the address space of the at least one other task.

7. The system of claim 6 wherein both address spaces belong to the same logical partition.

8. The system of claim 1 wherein the task scheduler writes input data received from the task to a private address space of the other task.

9. The system of claim 1 wherein each of the other tasks is the same task.

10. A computer aided method for scheduling and dispatching workload items between tasks, the method comprising:
    aggregating a file structure and partitioning the aggregated file structure into at least one logical partition, wherein each logical partition includes an operating system executing thereon and address spaces and a plurality of tasks executable therein;
    receiving, at a task scheduler executing from a primary operating system, a plurality of service requests from two or more tasks of the plurality of tasks, each service request identifying an action from at least one other task; and
    writing, for each task, the action, a first task identifier, and at least one other task identifier to at least one private memory address associated with the at least one other task.

11. The method of claim 10 wherein the service request is one of a start service request, a stop service request, a suspend service request, a resume service request, change the order of execution service request, and change priority of executing tasks service request.

12. The method of claim 10 wherein the task scheduler causes the instantiation of the at least one other task in response to the action.

13. The method of claim 10 wherein the address space of the task is the same as the address space of the at least one other task.

14. The method of claim 13 wherein the at least one other task is a sub-task of the task.

15. The method of claim 10 wherein the address space of the task is different from the address space of the one other task.

16. The method of claim 15 wherein both address spaces belong to the same logical partition.

17. The method of claim 15 wherein both address spaces belong to different logical partitions.

18. A non-transitory computer readable storage medium comprising a set of computer instructions executable by a processor for scheduling and dispatching workload items between tasks, the computer instructions configured to:
    execute the plurality of secondary operating systems on an aggregated file structure comprising at least one logical partition with each logical partition having a secondary operating system and address spaces and a plurality of tasks executable therein;
    receive, at a task scheduler executing from the primary operating system, a plurality of service requests from two or more tasks of the plurality of tasks, each service request identifying an action from at least one other task; and
    write, for each task, the action, a first task identifier, and at least one other task identifier to at least one private memory address associated with the at least one other task.

19. The system of claim 18 wherein the service request is one of a start service request, a stop service request, a suspend service request, a resume service request, change the order of execution service request, and change priority of executing tasks service request.

20. The system of claim 18 wherein the task scheduler causes the instantiation of the at least one other task in response to the action.

\* \* \* \* \*